United States Patent
Keller et al.

(10) Patent No.: US 6,683,126 B2
(45) Date of Patent: Jan. 27, 2004

(54) COMPOSITIONS FOR PRODUCING DIFFICULT-TO-WET SURFACE

(75) Inventors: Harald Keller, Ludwigshafen (DE); Ingolf Kühn, Schmerbach (DE); Ekkehard Jahns, Weinheim (DE); Christian Lach, Bad Dürkheim (DE); Stephan Hüffer, Ludwigshafen (DE); Thilo Krebs, Mannheim (DE); Yi Thomann, Umkirch (DE); Thomas Frechen, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 101 days.

(21) Appl. No.: 09/840,887

(22) Filed: Apr. 25, 2001

(65) Prior Publication Data

US 2002/0016433 A1 Feb. 7, 2002

(30) Foreign Application Priority Data

May 8, 2000 (DE) .......................... 100 22 246

(51) Int. Cl.[7] .............................. C08K 3/22; C08K 3/36
(52) U.S. Cl. ................ 524/492; 524/493; 524/543; 524/544; 524/546; 524/556; 524/560; 524/562; 524/570; 524/571; 524/577; 524/578; 524/579; 524/581; 524/582; 524/588; 524/601; 106/13; 252/8.62; 526/939; 516/1
(58) Field of Search ................. 524/492, 493, 524/543, 544, 546, 556, 560, 562, 570, 571, 577, 578, 579, 581, 582, 588, 601; 106/13; 252/8.62; 526/939

(56) References Cited

U.S. PATENT DOCUMENTS

| | | | | |
|---|---|---|---|---|
| 3,354,022 A | | 11/1967 | Detter et al. ................ 161/123 |
| 4,292,029 A | * | 9/1981 | Craig et al. ............... 433/228.1 |
| 5,296,282 A | | 3/1994 | Evers .......................... 428/195 |
| 5,482,787 A | * | 1/1996 | Sujita et al. ................ 428/623 |
| 5,955,530 A | * | 9/1999 | Inoue et al. ................ 524/492 |
| 6,003,779 A | * | 12/1999 | Robidoux ....................... 239/3 |
| 6,342,560 B1 | * | 1/2002 | Okel .......................... 106/468 |

FOREIGN PATENT DOCUMENTS

| | | | |
|---|---|---|---|
| EP | 0 754 738 | 1/1997 | |
| EP | 1 043 380 | 10/2000 | |
| JP | 01149868 A | * 6/1989 | ............ C09D/5/08 |
| WO | WO 96/04123 | 2/1996 | |
| WO | WO 2001148098 A1 | * 7/2001 | |

OTHER PUBLICATIONS

Barthlott et al. "Lotus–Effekt und Autolack: Die Selbstreinigungsfähigkeit mikrostruktuierter Oberflächen" Biologie No. 5, (1998) pp. 314–321.

* cited by examiner

Primary Examiner—Robert Dawson
Assistant Examiner—Marc S Zimmer
(74) Attorney, Agent, or Firm—Keil & Weinkauf

(57) ABSTRACT

The present invention provides a coating composition for producing difficult-to-wet surfaces, comprising i) at least one finely divided powder whose particles have a hydrophobic surface and a porous structure characterized by a BET surface area (determined in accordance with DIN 66131) of at least 1 $m^2/g$, and ii) at least one film-forming binder characterized by a surface tension <50 mN/m, the weight ratio of powder to binder being at least 1:4.

It also provides a process for producing difficult-to-wet surfaces, and provides for the use of the coating compositions for producing surfaces having a self-cleaning effect and for reducing the flow resistance for liquids in pipes.

17 Claims, No Drawings

COMPOSITIONS FOR PRODUCING DIFFICULT-TO-WET SURFACE

The present invention relates to a composition, especially a coating composition, for producing difficult-to-wet surfaces and to a process for producing such surfaces. The present invention relates in particular to the use of the coating compositions of the invention to produce a surface with a self-cleaning effect.

Usual surfaces are generally wetted by liquids. The degree of wetting is the result of an interplay between the forces of cohesion in the liquid and the forces of adhesion between liquid and surface.

In many cases, the wetting of a surface by a liquid is unwanted. For example, the wetting of surfaces with water results in the retention of water droplets on the surface and their evaporation, with the solids suspended or dissolved in the water remaining as unsightly residues on the surface. This problem exists in particular with surfaces exposed to rainwater.

The wetting of a surface with water is frequently also a trigger for its corrosion or for infestation with microorganisms and with growths such as algae, lichen, mosses, bivalves, etc.

In the context of packaging and storage vessels for liquids, low wettability of the interior surfaces is desired, so that only small amounts of liquid remain when the packaging or storage vessel is emptied.

In the field of apparatus and plant construction, as well, low wettability of components which come into contact with liquids is desired. If, indeed, the wettability of the components is high, there is a risk of increased formation of coverings and deposits. Furthermore, increased wettability generally has the consequence of increased flow resistance of liquids in pipelines.

It is known that the wettability of a surface by hydrophilic liquids may be reduced by a hydrophobic coating of the surface. Suitable coating materials in this context include polysiloxanes and perfluorinated polymers, especially the extremely hydrophobic polytetrafluoroethylene (Teflon). The coating reduces the forces of adhesion between liquid and wetted surface.

Furthermore, it has proven favorable to structure hydrophobic surfaces. Surface structures of this kind generally have regular or irregular elevations or depressions in the range from 0.1 to 1000 $\mu$m. The structuring firstly reduces still further the adhesion of the surface for polar liquids such as water. Furthermore, the structuring leads to reduced adhesion of solid deposits such as dirt particles on the surface. It has been found, moreover, that, given appropriate structuring, the dirt particles are flushed from the surface by moving water. This effect is also referred to as the self-cleaning effect or lotus effect (see Barthlott et al., Biologie in unserer Zeit, 28, No. 5, 314–322).

Accordingly, for example, WO 96/04123 describes self-cleaning surfaces of articles possessing an artificial surface structure which has elevations and impressions, the structure being characterized in particular by the distance between the elevations and the height of the elevations. The surfaces are produced, for example, by applying Teflon powder to an adhesive-treated surface or by embossing a structure onto a thermoplastically deformable hydrophobic material. U.S. Pat. No. 3,354,022 discloses similar surfaces. Here again, the surface is produced either by embossing a structure or by applying hydrophobic particles—wax particles, for example—to a hydrophobic surface. Also described is a surface comprising glass dust in a wax matrix.

EP 933 388 discloses a process for producing structured surfaces having hydrophobic properties, in which first of all a negative mold is produced by photolithography, this mold is used to emboss a polymer film, and the polymer film is subsequently hydrophobicized using fluoroalkyl silanes.

EP-A 909 747 describes a process for generating self-cleaning properties on ceramic structures such as roofing tiles, in which a dispersion of clay particles in an organic silicone resin solution is applied to the ceramic structures and the coating is cured.

JP 7328532-A discloses a coating process in which fine particles having a hydrophobic surface are applied to a wet coating, which is cured. In this case, water-repelling surfaces are obtained.

The methods the prior art describes for producing difficult-to-wet surfaces are either highly complex or do not lead to satisfactory results. The production of a structured surface by embossing techniques is complex and can only be employed economically with planar surfaces. Surfaces where structuring is brought about by subsequent application of hydrophobic particles are frequently difficult to reproduce or possess poor mechanical stability. Moreover, this process is also highly complex. Additionally, there is often a need for organofluorine compounds or fluoropolymers which not only are very expensive but also are ecologically objectionable.

It is an object of the present invention to provide a coating composition for producing surfaces with low wettability that can be used to produce, simply and reproducibly, stable coatings of low wettability.

We have found that this object is achieved in a coating composition comprising at least one porous powder having a high specific surface area which, additionally, is hydrophobic and at least one hydrophobic binder for the powder particles, the weight ratio of hydropobic powder to binder being at least 1:4.

The present invention accordingly provides a composition, especially in the form of a coating composition, for producing difficult-to-wet surfaces, comprising i) at least one finely divided powder whose particles have a hydrophobic surface and a porous structure characterized by a BET surface area (determined in accordance with DIN 66131) of at least 1 m$^2$/g, and ii) at least one film-forming binder characterized by a surface tension <50 mN/m, the weight ratio of powder binder being at least 1:4.

The compositions are easy to apply to surfaces. They reduce almost completely the wettability of the surface and produce a self-cleaning effect on these surfaces. It has also been found that the compositions of the invention can be processed to form shaped articles which have a difficult-to-wet surface. The present invention accordingly also provides a process for producing difficult-to-wet surfaces by applying a composition of the invention to a surface that is to be coated, and also provides for the use of the compositions to produce surfaces having self-cleaning effects.

To characterize surfaces with regard to their wettability it is possible to employ the static contact angle of a drop of liquid on a surface. The static contact angle is defined as the angle enclosed by said surface and a tangent along the surface of the liquid drop in the region of the contact point of the liquid drop with the surface, the contact angle being measured through the liquid drop. A contact angle of 0, accordingly, denotes complete wettability and no drop formation, whereas a contact angle of 180° denotes complete unwettability. The contact angle may be determined in accordance with known methods, with the aid, for example, of a microscope equipped with a goniometer (see also C. D. Bain et al., Angew. Chem. 101 (1989) 522–528 and also A. Born et al., Farbe & Lack 105 (1999) 96–104).

The surfaces treated with the compositions of the invention generally have static contact angles $\geq 120°$ and in particular $\geq 140°$ (determined at room temperature) for a variety of liquids, particularly water. The contact angle for water and aqueous solutions is generally at least 140°. Frequently, indeed, contact angles >160° are achieved, especially in the case of water. Contact angles above 160° cannot generally be determined with sufficient accuracy. A contact angle above 160° corresponds, however, in general to complete unwettability of the surface.

Another measure of the wettability of the surface is the repellent power $F_R$, which is defined as the reciprocal of the weight force $F_H$ required to cause a drop of liquid to run from an inclined surface. The repellent power is calculated using the following formula:

$$F_R = \frac{1}{F_H} = \frac{1}{\sin\alpha \cdot m \cdot g}$$

where m is the mass of the liquid drop, g is the gravitational acceleration, and $\alpha$ is the smallest possible angle of inclination of the surface under test, with respect to the horizontal, which is sufficient to cause the liquid drop to run from this surface.

By film-forming binders are meant, here and below, polymers and low molecular mass substances which form a solid film on a surface. The binders serve, for example, to fix the powder particles on the surface of the substrate to be coated or to fix the powder surfaces to one another when the compositions are used as powders or to produce a shaped article.

The hydrophobicity of the binder is characterized using its surface tension. This may be determined, for example, by measuring the static contact angle of water on a smooth surface coated with the binder. Hydrophobic binders feature static contact angles for water of at least 90°. It may also be determined by the pendant drop method (see S. Wu, "Polymer Interface and Adhesion", Marcel Dekker Inc., New York 1982, pp. 266–268). The stated values for the surface tension of the binders, here and below, relate to the values determined by the pendant drop method. Hydrophobic binders in the sense of the invention have a surface tension <50 mN/m. The surface tension of commercially customary binder polymers are in some cases indicated in the literature; see, e.g. Wu et al., op. cit. p. 88 ff. and also S. Ellefson et al., J. Am. Ceram. Soc. 21, 193, (1938); S. Wu, J. Colloid Interface Sci. 31, (1969), 153, J. Phys. Chem. 74, (1970), 632, J. Polym. Sci. C34 (1971) 19; R. J. Roe et al., J. Phys. Chem. 72, 2013 (1968), J. Phys. Chem. 71 (1967) 4190, J. Colloid Interface Sci. 31, (1969) 228; and J. F. Padday in Surface and Colloid Science (edited by E. Matijevic), Wiley, N.Y. 1969, pp. 101–149.

The invention prefers those binders which have a surface energy <42 mN/m and in particular <37 mN/m. It is generally sufficient for the binder to have a surface energy $\geq 10$ mN/m and in particular $\geq 20$ mN/m.

The binders generally comprise thermoplastic polymers which are soluble in organic solvents. The binders used may also comprise organic prepolymers which are crosslinked by a thermal, oxidative or photochemical curing process and so form a solid coating with the powder.

Binders are, furthermore, fatty acids having more than 8 carbon atoms, especially ethylenically unsaturated fatty acids, and their esters with polyfunctional alcohols such as glycerol, ethylene glycol, propanediol, sorbitol, glucose, sucrose or trimethylolpropane, the fatty acids and their esters curing oxidatively and so being included in the class of the prepolymers. Also suitable as binders are natural waxes such as beeswax, carnauba wax, wool wax, candelilla wax, and also synthetic waxes such as montanic acid waxes, montanic ester waxes, amide waxes, e.g., distearoylethylenediamine, Fischer-Tropsch waxes, and also waxlike polymers of ethylene and of propylene (polyethylene wax, polypropylene wax).

The nature of the binder depends in many cases on the desired end use and is of fairly minor importance for the success of the invention, provided the binder is sufficiently hydrophobic.

A preferred class of hydrophobic binders is that of homopolymers and copolymers of hydrophobic, ethylenically unsaturated monomers having a solubility <1 g/l (at 25° C.) in water. Monomers of this kind generally account for at least 50% by weight of the polymer used as binder.

Preferred hydrophobic monomers are selected from $C_2$–$C_{24}$ olefins, $C_5$–$C_8$ cycloolefins, fluoroolefins, fluorochloroolefins, vinyl aromatics, diolefins such as butadiene, isoprene and chlorobutadiene, and different monoethylenically unsaturated monomers containing at least one $C_2$–$C_{36}$ alkyl group, containing at least one $C_1$–$C_{22}$ fluoroalkyl group of the formula A, or containing an oligosiloxane group of the formula B:

where a is an integer from 0 to 6 and b is an integer from 1 to 16;

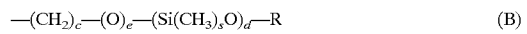

where c is an integer from 0 to 6 and d is an integer from 2 to 10,000, e is 0 or 1, and R is hydrogen, $Si(CH_3)_3$, alkyl having 1–18 carbon atoms, or O-alkyl having 1–18 carbon atoms.

Examples of preferred hydrophobic monomers are $C_2$–$C_{24}$ olefins, such as ethylene, propylene, n-butene, isobutene, n-hexene, n-octene, isooctene, n-decene, isotridecene, $C_5$–$C_8$ cycloolefins such as cyclopentene, cyclopentadiene, cyclooctene, vinyl aromatic monomers, such as styrene and $\alpha$-methylstyrene, and also fluoroolefins and fluorochloroolefins such as vinylidene fluoride, chlorotrifluoroethylene, tetrafluoroethylene, vinyl esters of linear or branched alkane carboxylic acids having 2 to 36 carbon atoms, e.g., vinyl acetate, vinyl propionate, vinyl n-butyrate, vinyl isobutyrate, vinyl hexanoate, vinyl octanoate, vinyl laurate and vinyl stearate, and also esters of acrylic acid and of methacrylic acid with linear or branched $C_2$–$C_{36}$ alkanols, e.g., ethyl (meth)acrylate, n-butyl (meth)acrylate, tert-butyl (meth)acrylate, n-hexyl (meth)acrylate, 2-ethylhexyl (meth)acrylate, 2-propylheptyl (meth)acrylate, lauryl (meth)acrylate and stearyl (meth)acrylate and also vinyl ethers and allyl ethers of $C_2$–$C_{36}$ alkanols, such as n-butyl vinyl ether and octadecyl vinyl ether, fluorinated monomers of the formulae A1 to A4:

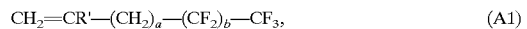

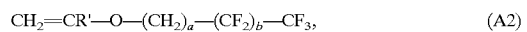

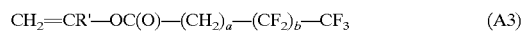

or

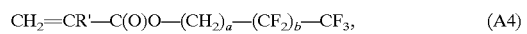

where a and b are as defined above and R' is hydrogen or methyl, and also monomers containing polysiloxane groups, of the formula B1:

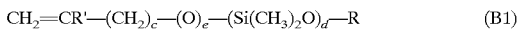

$$CH_2=CR'—(CH_2)_c—(O)_e—(Si(CH_3)_2O)_d—R \quad (B1)$$

where c, d, e, and R are as defined above and R' is hydrogen or methyl.

Typical binder polymers of this type are polyethylene, polypropylene, polyisobutene, polychlorotrifluoroethylene, polytetrafluoroethylene, polyvinyl acetate, polyethyl methacrylate, poly-n-butyl methacrylate, polyisobutyl methacrylate, poly-tert-butyl methacrylate, polyhexyl methacrylate, poly(2-ethylhexyl methacrylate), polyethyl acrylate, poly-n-butyl acrylate, polyisobutyl acrylate, poly-tert-butyl acrylate, poly(2-ethylhexyl acrylate), and copolymers of maleic acid with at least one hydrophobic monomer selected from $C_3$–$C_6$ olefins, $C_1$–$C_{36}$ alkyl vinyl ethers, the vinyl esters of aliphatic $C_1$–$C_{36}$ carboxylic acids, the monomers A1, A2, A3, A4 and B1, especially alternating copolymers of maleic acid with these monomers, and also the polymer-analogous reaction products of these copolymers with $C_1$–$C_{36}$ alkanols, alcohols of the formulae:

$$HO—(CH_2)_a—(CF_2)_b—CF_3, \quad (A5), or$$

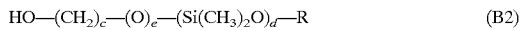

$$HO—(CH_2)_c—(O)_e—(Si(CH_3)_2O)_d—R \quad (B2)$$

with the definitions indicated above for a to e and R;
and/or with $C_1$–$C_{36}$ alkylamines, di-$C_1$–$C_{36}$-alkylamines or amines of the formulae:

$$H_2N—(CH_2)_a—(CF_2)_b—CF_3, \quad (A6), or$$

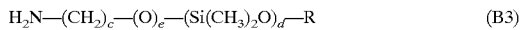

$$H_2N—(CH_2)_c—(O)_e—(Si(CH_3)_2O)_d—R \quad (B3)$$

$$HN[(CH_2)_a—(CF_2)_b—CF_3]_2, \quad (A7), or$$

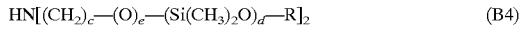

$$HN[(CH_2)_c—(O)_e—(Si(CH_3)_2O)_d—R]_2 \quad (B4)$$

with the definitions indicated above for a to e and R.

Further suitable binders are poly-$C_1$–$C_4$-alkylene oxides, such as polyoxymethylene, polypropylene oxide and polybutylene oxide, polytetrahydrofuran and also polycaprolactone, polycarbonates, polyvinylbutyral, polyvinylformal, and also linear or branched polydialkylsiloxanes such as polydimethylsiloxane (silicones).

Further suitable binders include partly aromatic polyesters made from aliphatic or aromatic dicarboxylic acids and aliphatic and/or aromatic diols, e.g.:

polyesters synthesized from aliphatic dialcohols having 2 to 18 carbon atoms, e.g., propanediol, butanediol, hexanediol, and dicarboxylic acids having 3 to 18 carbon atoms, such as adipic acid and decanedicarboxylic acid;

polyesters synthesized from bisphenol A and the above-mentioned dicarboxylic acids having 3 to 18 carbon atoms; and polyesters synthesized from terephthalic acid, aliphatic dialcohols having 2 to 18 carbon atoms, and dicarboxylic acids having from 3 to 18 carbon atoms.

The polyesters may optionally be terminated by long-chain monoalcohols having 4 to 24 carbon atoms, such as 2-ethyl hexanol or octadecanol. Furthermore, the polyesters may be terminated by long-chain monocarboxylic acids having 4 to 24 carbon atoms, such as stearic acid.

The weight-average molecular weight of the binder polymers may vary over a wide range and is generally in the range from 1000 to 10 million g/mol and preferably in the range from 2500 to 6 million, in particular 2500 to 5 million, g/mol (determined by viscometry). Where the binder polymer is a polyolefin, and especially polyisobutene, its weight-average molecular weight is preferably in the range from 30,000 to 6 million g/mol, or in the range from 500,000 to 5 million g/mol. In the case of polyoctadecyl vinyl ether the molecular weight is preferably in the range from 2000 to 10,000 g/mol and in particular in the range from 2500 to 5000 g/mol.

Typical photochemically and/or thermally crosslinkable binders are polymers and oligomers having ethylenically unsaturated double bonds, as used to prepare radiation-curable coating materials. These include, for example, flowable formulations of polyether acrylates, polyester arylates, polyurethane acrylates, polyesters with cocondensed maleic anhydride units, epoxy resins, e.g., aromatic epoxy resins, the oligomers and/or polymers being present, if desired, in solution in organic solvents and/or reactive diluents in order to improve their flowability. By reactive diluents are meant low molecular mass, ethylenically unsaturated liquids which on crosslinking form the coating together with the ethylenically unsaturated polymers.

Radiation-curable binders, and formulations comprising these binders, are well known to the skilled worker, e.g., from P. K. T. Oldring (Ed.) "Chemistry and Technology of UV & EB Formulation for Coatings, Inks & Paints", Vol. 2, 1991, Sita Technology London, and available commercially, for example, under the commercial brands Laromer® P084F, Laromer®LR8819, Laromer®PE55F, Laromer®LR8861, BASF Aktiengesellschaft, Ludwigshafen.

Binders which are particularly preferred in accordance with the invention are $C_2$–$C_6$ polyolefins, especially polyisobutene, atactic, isotactic, and syndiotactic polypropylene, polyethylene, and also homopolymers and copolymers of ethylenically unsaturated monomers containing $C_4$–$C_{36}$ alkyl groups, especially containing $C_8$–$C_{22}$ alkyl groups, and, if desired, ethylenically unsaturated comonomers copolymerizable therewith, and also $C_3$–$C_4$ polyalkylene oxides. Of these, particular preference is given to homopolymers and copolymers of $C_8$–$C_{36}$ alkyl vinyl ethers, e.g., polyoctadecyl vinyl ether.

The powders present in the compositions of the invention are characterized substantially by their hydrophobic surface and their porous structure, which is manifested in a high specific surface area. The specific surface area is the BET surface area determined in accordance with DIN 66131. The powder particles present in the coating compositions of the invention preferably have a BET surface area in the region of at least 5, in particular at least 10, and with particular preference at least 20 m²/g. In particular it is in the range from 5 to 1000 m²/g, with particular preference in the range from 10 to 800 m²/g, and with very particular preference in the range from 20 to 500 m²/g.

Suitable powder particles include not only inorganic materials which have a hydrophobic surface of physisorbed or chemisorbed organic molecules with alkyl groups, but also hydrophobic, organic polymer powders having a high specific surface area.

In one preferred embodiment, the powder particles comprise an oxide support with a hydrophobic layer on the surface of the support. Of course, the oxide support has a porous structure. The hydrophobic layer is formed of organic, nonpolar molecules or molecule groups which are physisorbed or chemisorbed on the surface of the support.

Examples of suitable oxide supports are aluminum oxide, titanium dioxide, and silicon dioxide. Preferably, the oxide support comprises pyrogenic silicon dioxide (pyrogenic silica; see Ullmann's Encylopedia of Industrial Chemistry, Volume A23, p. 635 ff.), which preferably has a specific surface area in the range from 50 to 400 m$^2$/g.

The powders with an oxide support material that are present in the compositions of the invention generally have a large number of alkyl groups or (per)fluoroalkyl groups on their surface. These groups form the hydrophobic layer. Preferably, the alkyl groups or (per)fluoroalkyl groups are present in the form of (perfluoro)alkyl silane groups or (perfluoro)alkylsiloxane groups, for example, in the form of (poly)dimethylsiloxane groups, which are linked with the oxide support material, for example, by physical interaction or by covalent bonds. Powder particles of this type are generally obtained by treating the oxide support material with a (perfluoro)alkyl-containing compound that contains at least one reactive functional group that undergoes a chemical reaction with the near-surface OH groups of the oxide support particle. Examples of compounds of this kind are hexamethyldisilazane, octyltrimethoxysilane, silicone oil, chlorotrimethylsilane, and dichlorodimethylsilane.

Porous powder particles comprising oxide support particles and a hydrophobic layer present on their surface are known or may be prepared by the methods known for the preparation of hydrophobicized pyrogenic silica. Hydrophobicized pyrogenic silica is obtainable commercially, for example, under the designation Aerosil® R 812S (from Degussa-Hüls, Germany).

Examples of finely divided organic powders with a hydrophobic surface are finely divided polymer powders, e.g., polytetrafluoroethylene powders or $C_2$–$C_4$ polyolefin powders, examples being the polyethylene powders and polypropylene powders obtainable by the process described in EP-A 761 696. The finely divided organic particles generally have a diameter in the range from 0.05 $\mu$m to 100 $\mu$m, preferably in the range from 0.05 $\mu$m to 50 $\mu$m. The weight-average particle size of the finely divided polymer powders (weight-average particle diameter of the powder particles) is generally above 0.2 $\mu$m and below 100 $\mu$m, and in particular is in the range from 0.5 to 50 $\mu$m.

In order to achieve the low wettability effect desired in accordance with the invention it has proven advantageous if the weight ratio of powder i) to binder ii) in the compositions of the invention is at least 1:4, in particular at least 1:3, and with particular preference at least 1:2, with very particular preference at least 1:1.5. This weight ratio will preferably not exceed a value of 100:1, in particular 50:1. With very particular preference, the weight ratio of i) to ii) is in the range from 1:1 to 5:1.

A preferred embodiment of the invention relates to compositions in the form of coating compositions.

The coating compositions according to the invention may be used in a dry form, i.e., as a powder formulation comprising both the finely divided powder i) and the polymeric binder ii).

In one preferred embodiment, however, the coating composition is employed in a form which is fluid at the processing temperature. The coating compositions may of course be processed both at room temperature and at temperatures above or below room temperature, for example, at temperatures in the range from 0° C. to 150° C., depending on the nature of the formulation.

In the fluid form, the coating compositions of the invention generally comprise not only the powder i) and the binder (ii) but also, if desired, an organic diluent or solvent, preference being given to those solvents which dissolve or swell the polymeric binder but not the finely divided powder i). This improves the formation of the coating.

Suitable solvents are volatile organic solvents which evaporate following the application of the coating, with or without heating, and so permit the formation of a uniform film of the binder polymer. Examples of suitable solvents are ketones, such as acetone and ethyl methyl ketone, volatile esters of acetic acid, such as ethyl acetate and n-butyl acetate, cyclic ethers, such as tetrahydrofuran, and also aliphatic and aromatic hydrocarbons, such as turpentine oil, petroleum, petroleum spirit, toluene, and xylene. Preferred organic solvents are the aforementioned aliphatic and aromatic hydrocarbons.

In the liquid formulations the solids content (total amount of powder i) and polymer binder ii), based on the overall weight of the formulation) is in the range from 0.5 to 80% by weight. In conventional coating compositions, the solids content is frequently in the range from 10 to 50% by weight. In the case of sprayable coating materials it may also be below this level, e.g., in the range from 0.5 to 10% by weight.

The coating compositions of the invention may also be formulated as aerosols. In that case they comprise not only the powder i) and the binder ii) but also at least one propellant and, if desired, one of the solvents mentioned for the liquid formulations. Suitable propellants are the substances customary for this purpose, such as propane, butane, dimethyl ether, $CO_2$, $N_2O$, and mixtures thereof. The solids content of sprays is generally within the ranges customary for the purpose—for example, in the range from 0.1 to 10% by weight. Besides the components i) and ii), the solids may also comprise solid additives. The remaining fractions of the coating compositions formulated as aerosols are accounted for by propellant gases and, if appropriate, solvents.

To produce the difficult-to-wet surface, the coating compositions of the invention are applied conventionally to the substrates that are to be coated.

In principle, all conventional surfaces may be coated with the coating compositions of the invention. Examples of conventional surfaces are the surfaces of wood, metal, glass and plastic. The coating compositions of the invention may of course also be used to coat rough and/or porous surfaces, such as concrete, plaster, paper, woven fabric, examples including textile woven fabric for clothing, umbrellas, tents, and marquees, and for comparable applications, and also leather and hair as well.

The application of the coating to the surface that is to be coated (also referred to as the substrate hereinbelow) is made, depending on the embodiment of the coating composition and on the nature of the substrate, in accordance with the application techniques customary in coatings technology. In the case of flowable coating compositions containing solvent, application is made generally by brushing, spraying, e.g., by means of airbrush, dipping or rolling, with subsequent drying of the coating, during which the solvent evaporates.

If the binder ii) used is a thermally, oxidatively or photochemically crosslinkable prepolymer, then the coating compositions are in many cases flowable even without adding solvents and may be applied by the abovementioned technique, possibly following dilution with a reactive diluent. In this case the actual coating is formed by thermal, oxidative or photochemical curing (crosslinking) of the prepolymers.

In the case of pulverulent coating compositions, the customary techniques of powder coating are employed. In these techniques, the pulverulent coating composition is applied in the desired amount to the substrate that is to be coated, and is subsequently heated, and the thermoplastic polymeric binder melts and forms a polymeric film which fixes the powder particles of the invention to the surface. The pulverulent coating composition can also be applied to a surface provided with a pressure-sensitive adhesive. This likewise results in the fixing of the pulverulent composition to the surface to be coated and thus the formation of a difficult-to-wet surface.

In order to achieve the desired effect, the coating composition will be applied preferably in an amount of at least 0.01 g/m², in particular at least 0.1 g/m², and especially at least 0.5 g/m² and preferably not more than 1000 g/m², based on the solid constituents of the coating composition, to the surface that is to be coated. Solid constituents in this context are essentially the components i) and ii). This corresponds to an areal weight of the coating, following the evaporation of volatile constituents, of at least 0.01 g/m², in particular at least 0.1 g/m², and especially at least 0.5 g/m². In many cases, the coatings are applied in amounts of up to 100 g/m² to the surface that is to be coated (based on solid constituents), although in other forms of application larger amounts of coating composition will be applied: for example, in the case of coatings in the form of masonry paints, or in the context of the coating of concrete roofing slabs.

Another embodiment relates to the use of the compositions of the invention for producing shaped articles having difficult-to-wet surfaces.

The production of the shaped articles from the compositions of the invention may take place in a manner known per se in accordance with customary processes for producing shaped articles from thermoplastics or thermosets. An overview is given in A. Franck, Kunststoffkompendium, 4th edition pp. 147–205, Vogel Buchverlag, Würzburg 1996: Johannaber, Kunststoffmaschinenführer, 3rd edition, Hauser Munich, Vienna 1992. In general, for this purpose, a composition which is preferably fluid at processing temperature or which melts or shows coldflow at processing conditions is subjected to a customary shaping process, for example, when using thermoplastic binders, to a thermoforming, extrusion, injection molding or blow molding process. When using curable binders, suitable processes include those used for producing shaped articles from thermosets and/or reactive resins, examples being reaction injection molding, extrusion, and compression molding. The compositions may also be processed in the form of powders, especially when using thermoplastic binders, by means, for example, of compression molding and sintering.

In terms of the strength of the shaped articles, it has proven advantageous for producing shaped articles of the invention if the weight ratio of powder i) to binder ii) does not exceed a level of 10:1, preferably 5:1, in particular 4:1, and with particular preference 3:1. For the surface properties of the invention it is of advantage if the weight ratio of powder i) to binder ii) is at least 1:3, in particular at least 1:2, and with particular preference at least 1:1.5.

The shaped articles of the invention have at least one surface which is composed of the compositions of the invention; in other words, the shaped article may be constructed entirely from the compositions of the invention, or may only have surface regions which are composed of the compositions of the invention, while the rest of the shaped article is composed of other regions. Examples of such articles are shaped articles sheathed with the compositions of the invention, such as sheathed pipes or sheathed cables.

The substrates coated with the compositions of the invention are notable for very low forces of adhesion with respect to liquids and solids. Liquids, especially hydrophilic liquids, such as water, aqueous solutions, dispersions and suspensions, polar organic liquids, especially those which are soluble in water, e.g., $C_1$–$C_4$ alkanols, glycols, glycerol and mixtures thereof, and also melts of polar organic compounds, e.g., of carbohydrates and comparable compounds, bead off from these coatings without residue.

Furthermore, the surfaces coated with the coating compositions of the invention are notable for a self-cleaning effect. Solids, especially particulate solids, may be removed from the surface by flushing with liquids such as water without cleaning agents. Surprisingly, the particulate solids may also be removed very easily by means of compressed air.

The same advantageous properties as the surfaces coated in accordance with the invention are also possessed by the shaped articles produced from the compositions of the invention. Furthermore, the shaped articles surprisingly do not lose these properties even when their surface is destroyed, by roughening or scratching, for example. This property makes it possible to regenerate the advantageous surface properties if the surfaces age.

Moreover, the flow resistance of liquids, especially water and aqueous solutions, is reduced when they flow through pipes, capillaries or nozzles which have been coated with the coatings of the invention.

On the basis of their properties, the compositions of the invention can be put to a great diversity of uses.

Materials susceptible to corrosion, such as concrete, including steel-reinforced concrete, wood or metal may be effectively protected against corrosion by coating with the coating compositions of the invention.

The compositions of the invention are suitable, moreover, for the surface finishing of paper, card, or polymer films.

Electrical equipment which is exposed to weathering and which picks up dirt under weathering conditions, such as high-tension outdoor lines, voltage converters, insulators, parabolic antennas, etc., and which suffer losses of performance in the soiled or wet state, can be treated with the compositions of the invention. By this means the pickup of dirt is reduced and a loss of performance prevented.

The compositions of the invention are additionally suitable for affording protection against soiling in particular to surfaces which are exposed to weathering, examples being roofs, facades, windows, garden and balcony furniture, motor vehicles, traffic signs, advertising hoardings, solar installations, etc. Likewise conceivable is the use of the coating compositions of the invention in the sanitary sector, for example, as coatings for fittings, wet cells, bathtubs, pools, wall tiles and floor tiles, etc. The use of the coating compositions in this case not only prevents the deposition of dirt from the water but also prevents the infestation and growth of unwanted organisms, such as microorganisms, algae, lichen, and mosses.

Furthermore, the compositions of the invention can be used to coat components which come into contact with liquids. Mention may be made here, in particular, of pipes, vessels, tanks, reactors, heat exchangers, evaporators, condensers, pumps, nozzles, atomizers, spray dryers, crystallizers, bottling plants, etc. The provision of these components with the compositions of the invention prevents the deposition of solid constituents or decomposition products from the liquids. This in turn reduces the formation of coverings, deposits, blockages and fouling on the surfaces of the components which come into contact with the liquids. Furthermore, in the plant components, such as in pipes, for example, the surfaces of the invention reduce the flow resistance of liquids. They thus reduce the energy required to convey especially high-viscosity liquids through the plant components.

By equipping the cooling surfaces of cooling equipment with the compositions of the invention it is possible to reduce the icing which frequently occurs. The use of the coating compositions to coat the hulls of ships reduces the frictional resistance engendered by the water and so reduces the fuel consumption. In the case of aircraft, the risk of icing can be reduced by coating the external surfaces with the coating compositions of the invention.

Packaging for liquids which has been provided with the compositions of the invention can be emptied with virtually no residue, thereby permitting better utilization of the liquid and facilitating the recycling of the packaging materials, since they are not contaminated by residues of the liquid.

Storage vessels whose internal surfaces have been provided with the compositions of the invention are easier to empty and, because of the self-cleaning effect, can be cleaned with ease by rinsing them out with water, without the use of surfactants.

Fabrics, especially textile fabrics, which have been provided with the compositions of the invention are notable for a high level of imperviousness to water and a low level of water absorption, and repel dirt. By treatment with the compositions of the invention, the fabric becomes downright water-repellent. Particles of dirt can easily be rinsed off with water without any significant absorption of water. The compositions of the invention are suitable, accordingly, as a water- and dirt-repellent finish for fabric which can be used, for example, to produce clothing, tents, marquees, tarpaulins, umbrellas, to line compartments, e.g., motor vehicle interiors, to line seating areas, in the automotive sector, for example.

Leather which has been treated with the compositions of the invention is suitable for producing leather clothing and shoes having water- and dirt-repellent properties.

In the field of cosmetology, the compositions of the invention may be used as hair treatment compositions, e.g., in the form of hairsprays, provided they comprise a cosmetically compatible binder i), e.g., the polymers commonly employed for this purpose.

Components and shaped articles can be used in a similar fashion.

The present examples are intended to illustrate the invention without, however, restricting it.

I. ANALYSIS

I.1 General procedure for determining the repellent power

The article for investigation is mounted on a measurement bench whose inclination can be adjusted from 1° to 90°. Then, using a hollow needle, drops of liquid are allowed to fall onto the sample, the distance of the hollow needle from the sample surface being 10 mm. The drops have a defined mass, determined by weighing beforehand. By lowering the angle of inclination a in steps, the minimum angle of inclination at which the drops still just bead off is determined. The repellent power $F_R$ is calculated in accordance with the formula given above from the minimum inclination angle α, the drop mass m, and the gravitational acceleration g. The repellent power is expressed in millinewtons$^{-1}$ and is a quantitative measure of the capacity of a surface to allow liquid drops to bead off without residue.

I.2 Determination of the contact angle:

The contact angle was determined using a type G1 instrument from Krüss GmbH. To this end, a stainless steel hollow needle with an internal diameter of 0.5 mm was used to apply a drop of distilled water to the surface under investigation. Then, using a goniometer, the contact angle between water drop and surface was determined optically. On highly hydrophobic surfaces like those to which the present invention relates, the water drop exhibits virtually no adhesion to the surface. On exit from the stainless steel hollow needle, the water drop remains adhering to the hollow needle until it drips off owing to its weight. In the case of surfaces of this kind it is no longer possible to determine the contact angle precisely, but it is estimated at >160°.

II PREPARATION EXAMPLES

Example 1: Coating composition B1

10.73 g of polyoctadecyl vinyl ether having a molecular weight of approximately 3000 g/mol (determined by viscometry) were dissolved in 96.6 g of petroleum spirit (boiling range 60 to 80° C.). 10.73 g of a commercial hydrophobicized pyrogenic silica having a BET surface area of 220 m$^2$/g (determined in accordance with DIN 66131; Aerosil® R812S) were dispersed in this solution with intensive stirring.

The polyoctadecyl vinyl ether used in the examples has a surface tension of 27.7 mN/m, determined on a melt by the pendant drop method.

Example 2: Coating composition B2

2.73 g of polyisobutene having a weight-average molecular weight of 4.7 million g/mol (determined by viscometry) were dissolved in 113 g of tetrahydrofuran. 6.37 g of a commercial hydrophobicized pyrogenic silica having a BET surface area of 220 m$^2$/g (Aerosil® R812S) were dispersed in this solution.

Polyisobutene has a surface tension of 33.6 mN/m (cf. S. Wu, op. cit., p. 88 ff.).

Example 3: Production of a film F1 coated with the coating composition B1

The coating composition B1 was applied to a polyethylene terephthalate film using a coating bar with a gap of 100 μ. The coating was obtained by evaporating the petroleum spirit.

The repellent power of the film F1, determined for a 10% strength by weight aqueous ethanol solution, was 358 mN$^{-1}$. The drop mass in this case was 5.44 mg.

Example 4: Production of a glass bottle coated with B1.

A commercially customary white glass bottle was filled completely with the coating composition B1. The coating composition was left in the glass bottle for about one minute and then poured out again. Evaporation of the petroleum spirit gave a glass bottle coated on its inside.

Example 5: Production of a polymer film F2 coated with B2

The coating composition B2 was applied to a polyethylene terephthalate film in the manner described in example 3 and the solvent was evaporated.

The repellent power of the film F2, determined for a 10% strength by weight aqueous ethanol solution, was 154 mN$^{-1}$. The drop mass in this case was 5.44 mg.

Example 6: Coating composition B3

5 g of polyoctadecyl vinyl ether having a molecular weight of 3000 g/mol (see above) were dissolved in 90 g of petroleum spirit (boiling range 60 to 80° C.). 5 g of a commercial hydrophobicized pyrogenic silica having a BET surface area of 220 m²/g (Aerosil® R812S) were dispersed in this solution.

Example 7: Coating composition B4

1.5 g of polyisobutene having a molecular weight of 4,700,000 g/mol (determined by viscometry) were dissolved in 50 g of spirit (boiling range 60–80° C.). 13.5 g of polytetrafluoroethylene powder having a particle size of 1 μm and a specific BET surface area of 8.01 m²/g (manufacturer: Aldrich) were dispersed with intensive stirring in this solution.

Example 8: Production of a glass plate F3 coated with coating composition B4

The coating composition B4 was applied to a glass plate using a coating bar having a gap of 100 μm. Evaporation with petroleum spirit gives a coat which is no longer wetted by water.

The static contact angle of the coated glass plate F3 with regard to water is >160°.

The repellent power of the glass plate F3, determined for a 10% strength by weight ethanol solution, was 36 mN⁻¹. The drop mass in this case was 5.44 mg.

Example 9: Coating composition B5 (spray coating)

2.73 g of polyisobutene having a molecular weight of 4,700,000 g/mol (determined by viscometry) were dissolved in 900.9 g of spirit (boiling range 60–80° C.). 6.37 g of a commercial hydrophobicized pyrogenic silica having a BET surface area of 220 m²/g (Aerosil® R812S) were dispersed in this solution.

Example 10: Production of a wooden board F4 coated with coating composition B5

The coating composition B5 was applied to a wooden board using an airbrush (type HY-MAX HP 10). Drying gives a coat which is no longer wetted by water.

The repellent power of the wooden board F4, determined for a 10% strength by weight aqueous ethanol solution, was 537 mN⁻¹. The drop mass in this case was 5.44 mg.

Example 11: Coating composition B6 (aerosol)

2.73 g of polyisobutene having a molecular weight of 4,700,000 g/mol (determined by viscometry) were dissolved in 900.9 g of spirit (boiling range 60–80° C.). 6.37 g of a commercial hydrophobicized pyrogenic silica having a BET surface area of 220 m²/g (Aerosil® R812S) were dispersed in this solution. 50 g of this dispersion were introduced into a spray can. Then 21.4 g of propellant gas were injected.

Example 12: Production of a glass plate F5 coated with coating composition B6

The coating composition B6 was sprayed onto a glass plate and dried for 3 minutes.

The repellent power of the glass plate F5, determined for a 10% strength by weight aqueous ethanol solution, was 77 mN⁻¹. The drop mass in this case was 5.44 mg.

Example 13: Coating composition B7

1.5 g of polyisobutene having a molecular weight of 4,700,000 g/mol (determined by viscometry) were dissolved in 78.8 g of spirit (boiling range 60–80° C.). 13.5 g of a polypropylene powder having a particle size <36 μm and a BET surface area of 5.3 m²/g (prepared in accordance with EP-A 761696) were dispersed in this solution.

Example 14: Production of glass plate F6 coated with coating composition B7

The coating composition B7 was applied to a glass plate using a coating bar having a gap of 150 μm. Evaporation with petroleum spirit gives a coat which is no longer wetted by water. The static contact angle with regard to water is more than 160°.

The repellent power of the glass plate F6, determined for a 10% strength by weight ethanol solution, was 90 mN⁻¹. The drop mass in this case was 5.44 mg.

Example 15: Coating composition B8

1.5 g of polyisobutene having a molecular weight of 4,700,000 g/mol (determined by viscometry) were dissolved in 48.6 g of spirit (boiling range 60–80° C.). 6 g of a polypropylene powder having a particle size <36 μm and a BET surface area of 5.3 m²/g (prepared in accordance with EP-A 761696) were dispersed in this solution.

Example 16: Production of glass plate F7 coated with coating composition B8

The coating composition B8 was applied to a glass plate using a coating bar having a gap of 150 μm. Evaporation with petroleum spirit gives a coat which is no longer wetted by water. The static contact angle with regard to water is more than 160°.

The repellent power of the glass plate F7, determined for a 10% strength by weight ethanol solution, was 50 mN⁻¹. The drop mass in this case was 5.44 mg.

Example 17: Preparation of a pulverulent composition

Coating composition B1 was concentrated to dryness on a rotary evaporator and dried under reduced pressure at 50° C. The solid was ground to a powder in an analytical mill from IKA (model IKA A10).

Example 18

Using the same procedure as in example 17, coating composition B2 was converted into a pulverulent composition.

Example 19

An adhesive film was moved for 10 seconds in the powder from example 17. Subsequently, the resulting film was blown dry with compressed air. A thin powder layer adhered to the adhesive film. The specimen was not wetted by water. The static contact angle for water was >160°.

Example 20

Using the same procedure as in example 19, an adhesive film was coated with the pulverulent composition from example 18. The coated surface obtained was not wetted by water. The static contact angle for water was >160°.

Example 21: Production of the shaped article

The powder from example 17 was compressed in a shaping press at a pressure of $7.4 \times 10^7$ Pa to give a board having a thickness of 2 mm. The board was not wetted by water. The static contact angle for water was >160°.

Example 22: Production of a shaped article

Using the same procedure as in example 21, a thin board with a thickness of 2 mm was produced from the powder of example 18. The static contact angle for water was >160°.

III Performance investigations

Wettability test:

The coated films F1 and F2 described in examples 3 and 5, the films of examples 19 and 20, the glass plate F3 from example 8, the wooden board F4 from example 10 and the boards of examples 21 and 22 were mounted on a measurement bench setup for determining the repellent power. At an inclination angle of 10°, the following aqueous liquids in defined amounts were applied in succession as drops:

water (30 mg),
coffee (30 mg),
honey (59 mg),
aqueous hydrochloric acid (32% strength by weight, 41 mg),
aqueous sodium hydroxide (5% strength by weight, 45 mg),
30% strength by weight solution of polyacrylic acid in water (47 mg),
30% strength by weight solution of a copolymer of vinyl pyrrolidone and vinyl imidazole in water (35 mg),
aqueous polymer dispersion Acronal® 290D (BASF Aktiengesellschaft, 58 mg),
aqueous polymer dispersion Styronal® D808 (BASF Aktiengesellschaft 46 mg).

At an inclination angle of 10° to the horizontal, all of the drops ran off without residue from the films F1 and F2, from the glass plate F3, and from the wooden board F4.

In a comparative experiment, the liquids listed above were applied dropwise to an untreated PET film. The inclination angle of the sample was again 10° to the horizontal. In all cases the surface was wetted; with the exception of water, all of the liquids left residues on the film.

The coated glass plates F5, F6 and F7 were likewise investigated in the manner described above. For this investigation the following liquids were used:

water (30 mg),
coffee (30 mg),
honey (59 mg),
aqueous hydrochloric acid (32% strength by weight, 41 mg),
aqueous sodium hydroxide (5% strength by weight, 45 mg),
30% strength by weight solution of polyacrylic acid in water (47 mg),
30% strength by weight solution of a copolymer of vinyl pyrrolidone and vinyl imidazole in water (35 mg).

With the exception of the aqueous polyacrylic acid and honey, all of the drops ran off without residues. Honey and the polyacrylic acid solution left small amounts of liquid on the surface.

Soil removal test:

The films F1 and F2, the films of examples 18 and 19, the glass plates F3 and F6, the boards of examples 20 and 21 and the coated wooden board F4 were soiled with carbon black powder (Printex® V, BASF Drucksysteme GmbH). Water was then applied dropwise to the coating. The carbon black powder was removed fully by the beading water drops in the case of F1, F2 and F3, almost fully in the case of F4 and F6, so that the original surface was regained. There was no need to use cleaning agents.

In a comparative experiment, an untreated PET film was soiled with carbon black powder (Printex® V, BASF Drucksysteme GmbH). Water was then applied dropwise to the films. The carbon black powder was removed by the beading water drops only in part, so that specks of carbon black remained on the film.

Furthermore, white paper was sprayed with the aerosol B6 from example 11 and then dried for about 3 minutes. The sprayed paper was soiled with carbon black powder (Printex® V, BASF Drucksysteme GmbH) and then washed with water. The carbon black powder was removed by the beading water drops, so that the original clean paper surface was regained. Following the beading of the water drops, the paper had not softened but instead was completely dry.

In a comparative experiment, an unsprayed white paper was soiled with carbon black powder and then washed off with water. The water running off removed the carbon black only to a small extent, so that specks of carbon black remained on the paper. After the runoff of water, the paper was wet and had softened.

Fouling prevention test:

The coated film F2 was heated to 110° C. Melted sorbitol (110° C.) was applied dropwise to the hot film. The sorbitol drops did not wet the film. A low inclination angle of the film of approximately 5° led to complete, residue-free runoff of the melted sorbitol drops.

In a further investigation, further melted sorbitol was applied dropwise to the heated film and then cooled to 20° C. In this case the sorbitol drops solidified to form sticky, resinous drops which could be removed fully from the film by gentle contact with a spatula. No sorbitol residues were observed on the film.

The film from example 20 and the board from example 22 were investigated in a similar fashion. The same results as for the film F2 were found.

For comparison purposes, a sorbitol melt (110° C.) was applied dropwise to an uncoated polyethylene terephthalate film at 110°. The sorbitol melt wetted the film surface, and even at an inclination angle of 90° the melt did not run off from the film without residue. Cooled sorbitol (20° C.) underwent bonding with the film, and could not be removed from the film mechanically without residue.

Mechanical stability:

The boards of examples 20 and 21 were sanded down with emery paper (grade 320) until they had lost 10% of their weight. The resulting boards had a static contact angle for water >160° and were also not wetted by the liquids mentioned under III (water, coffee, honey, aqueous HCl, aqueous NaOH, aqueous polyacrylic acid, aqueous polyvinylpyrrolidone/vinylimidazole copolymer, Acronal® 290 D and Styronal® D808.

Reduction of flow resistance:

A commercial capillary viscometer (from Schott, Type 50140/IV) having a capillary diameter of 3.6 mm was filled completely with the coating composition B3. After 5 minutes, the coating composition B3 was poured out again. Subsequently, in order to remove the solvent, dried air was passed through the capillary for about 15 minutes. Subsequently, the efflux time of glycerol was determined at 20° C. It was 55 seconds. The efflux time with a mixture of 95 g of glycerol and 5 g of water was 24 seconds.

For comparison purposes, the efflux times of the above-mentioned solutions were determined in a viscometer of identical construction which had not been coated. In the case of glycerol, the efflux time was 74 seconds. In the case of the mixture of 95 g of glycerol and 5 g of water, it was 31 seconds. This corresponds to a reduction in efflux time of 26% in the case of glycerol and 23% in the case of the mixture of glycerol and water. The examples clearly show that the flow resistance of flowing liquids in pipelines is reduced by the coatings of the invention.

We claim:

1. A process for producing a difficult-to-wet surface, which comprises applying a coating composition to a conventional surface selected from the group consisting of wood, metal, glass, plastic, concrete, plaster, paper, shaped articles, paper, card, or polymer films, electrical equipment, surfaces exposed to weathering, surfaces in the sanitary sector, components which come into contact with liquids, cooling equipment, ship hulls, external surfaces of aircraft, packaging for liquids, storage vessels, fabric, leather, and hair, wherein the coating composition comprises i) at least one finely divided powder whose particles have a hydrophobic surface and a porous structure characterized by a BET surface area, determined in accordance with DIN 66131, of at least 1 m$^2$/g, and ii) at least one film-forming binder characterized by a surface tension <50 mN/m and which is selected from the group consisting of $C_2$–$C_6$ polyolefins, homopolymers of ethylenically unsaturated monomers containing $C_8$–$C_{36}$ alkyl groups, and copolymers of ethylenically unsaturated monomers containing $C_4$–$C_{36}$ alkyl groups $C_1$ to $C_{36}$ alkyl vinyl ethers, vinyl esters of $C_1$ to $C_{36}$ carboxylic acids, and ethylenically unsaturated comonomers copolymerizable therewith, the weight ratio of powder to binder being at least 1:1.5.

2. The process as claimed in claim 1, wherein the powder particles comprise an oxide support and a hydrophobic coat on the surface of the support.

3. The process as claimed in claim 2, wherein the oxide support is pyrogenic silica.

4. The process as claimed in claim 2, wherein the hydrophobic surface coat on the hydrophobic support is formed by (perfluoro)alkyl silane groups and/or (perfluoro)alkyl siloxane groups which are linked to the oxide support.

5. The process as claimed in claim 1, wherein the finely divided powder is a polymer powder having a weight-average particle size in the range from 0.2 to 100 µm.

6. The process as claimed in claim 5, wherein the polymer powder is selected from polytetrafluoroethylene powders and $C_2$–$C_4$ polyolefin powders.

7. The process as claimed in claim 1, wherein the film-forming binder is a polymer selected from homopolymers and copolymers of ethylenically unsaturated monomers having a solubility <1 g/l in water at 25° C., and, optionally, suitable comonomers.

8. The process as claimed in claim 1, wherein the coating composition is a flowable formulation further comprising at least one organic diluent or solvent.

9. The process as claimed in claim 1, wherein the coating composition is an aerosol further comprising at least one propellant.

10. The process as claimed in claim 1, wherein the composition is applied in an amount of from 0.01 to 1000 g/m$^2$ based on the solid constituents of the coating composition, to the surface that is to be coated.

11. The process as claimed in claim 1, wherein the weight ratio of powder i) to binder ii) is in the range from 1:1 to 1:5.

12. The process as claimed in claim 1, wherein the binder is selected from copolymers of maleic acid with at least one further monomer selected from $C_3$–$C_6$ olefins, $C_1$–$C_{36}$ alkyl vinyl ethers, and vinyl esters of aliphatic $C_1$–$C_{36}$ carboxylic acids.

13. A process for producing a difficult-to-wet surface, which comprises applying a coating composition to a conventional surface selected from the group consisting of wood, metal, glass, plastic, concrete, plaster, paper, shaped articles, paper, card, or polymer films, electrical equipment, surfaces exposed to weathering, surfaces in the sanitary sector, components which come into contact with liquids, cooling equipment, ship hulls, external surfaces of aircraft, packaging for liquids, storage vessels, fabric, leather, and hair, in an amount of from 0.01 to 1000 g/m$^2$ based on the solid constituents of the coating composition, wherein the coating composition comprises i) at least one finely divided powder whose particles have a hydrophobic surface and a porous structure characterized by a BET surface area, determined in accordance with DIN 66131, of at least 1 m$^2$/g, and ii) at least one film-forming binder, which is a thermoplastic polymer and which is characterized by a surface tension <50 mN/m, the weight ratio of powder to binder is in the range from 1:1 to 1:5.

14. The process as claimed in claim 13, wherein the binder is selected from $C_2$–$C_6$ polyolefins, homopolymers and copolymers of ethylenically unsaturated monomers containing $C_4$–$C_{36}$ alkyl groups, copolymers of copolymers of ethylenically unsaturated monomers containing $C_4$–$C_{36}$ alkyl groups and ethylenically unsaturated comonomers copolymerizable therewith, $C_3$–$C_4$ polyalkylene oxides and copolymers of maleic acid with at least one further monomer selected from $C_3$–$C_6$ olefins, $C_1$–$C_{36}$ alkyl vinyl ethers, and vinyl esters of aliphatic $C_1$–$C_{36}$ carboxylic acids.

15. A process as claimed in claim 1, wherein the composition is applied in an amount of from 0.1 to 100 g/m$^2$ based on the solid constituents of the coating composition, to the surface that is to be coated.

16. A process as claimed in claim 13, wherein the composition is applied in an amount of from 0.1 to 100 g/m$^2$ based on the solid constituents of the coating composition, to the surface that is to be coated.

17. A shaped article, which comprises at least one difficult-to-wet surface region which is composed essentially of a coating composition comprising i) at least one finely divided powder whose particles have a hydrophobic surface and a porous structure characterized by a BET surface area, determined in accordance with DIN 66131, of at least 1 m$^2$/g, and ii) at least one film-forming binder characterized by a surface tension <50 mN/m and which is selected from the group consisting of $C_2$–$C_6$ polyolefins, homopolymers of ethylenically unsaturated monomers containing $C_8$–$C_{36}$ alkyl groups, and copolymers of ethylenically unsaturated monomers containing $C_4$–$C_{36}$ alkyl groups and ethylenically unsaturated comonomers copolymerizable therewith, the weight ratio of powder to binder being at least 1:1.5.

* * * * *